United States Patent [19]

Lauterbach

[11] Patent Number: 4,477,526

[45] Date of Patent: Oct. 16, 1984

[54] HIGH STRENGTH ARAMID SPUN YARN

[75] Inventor: Herbert G. Lauterbach, Wilmington, Del.

[73] Assignee: E. I. Du Pont de Nemours and Company, Wilmington, Del.

[21] Appl. No.: 389,622

[22] Filed: Jun. 18, 1982

[51] Int. Cl.³ .............................................. D02G 3/00
[52] U.S. Cl. ..................................... 428/399; 19/0.35; 57/200; 57/907; 428/359; 428/362; 428/364; 428/369; 428/373
[58] Field of Search ............... 428/364, 373, 369, 359, 428/362, 399, 400, 364; 57/907, 200; 19/0.35, 0.41, 0.37, 0.39

[56] References Cited

U.S. PATENT DOCUMENTS

| | | | |
|---|---|---|---|
| 2,941,259 | 6/1960 | Lohrke, Jr. | 19/0.39 |
| 3,627,737 | 12/1971 | Smith | 528/348 X |
| 3,767,756 | 10/1973 | Blades | 524/422 |
| 3,817,941 | 6/1974 | Bair et al. | 528/348 |
| 3,869,430 | 3/1975 | Blades | 528/348 |
| 4,364,998 | 12/1982 | Wei | 428/399 |

Primary Examiner—Lorraine T. Kendell

[57] ABSTRACT

High strength, high modulus, continuous filament aromatic polyamide yarns are stretch broken under high tension while being sharply deflected in a lateral direction by mechanical means to provide a sliver which is processed by conventional means to a high strength, high modulus spun yarn. The broken ends of the fibers are highly fibrillated to fibrils having lengths of 50–350 times the diameter of the unfibrillated portion of each fiber.

4 Claims, 7 Drawing Figures

HIGH STRENGTH ARAMID SPUN YARN

This invention relates to slivers of stretch broken high tenacity high modulus aramid fibers, a process for making the slivers and high strength, high modulus spun yarns prepared from the slivers.

BACKGROUND OF THE INVENTION

The term "aramid" is used to designate wholly aromatic polyamides. Not all aramid fibers are useful in the present invention but only those derived from aromatic polyamides whose chain extending bonds are either coaxial or parallel and oppositely directed. High strength, high modulus aramid fibers useful in the present invention may be prepared by the processes described in U.S. Pat. Nos. 3,767,756 and 3,869,430. The fibers are characterized by filament tenacities of at least 18 gpd (15.9 dN/tex) and moduli of at least 400 gpd (354 dN/tex). These fibers will be referred to hereinafter as p-aramid fibers. Particularly preferred are p-aramid fibers based on poly(p-phenylene terephthalamide) as produced by Du Pont under the trademark Kevlar ®.

P-aramid fibers are characterized by their excellent high-temperature durability. Not only do such fibers fail to soften at temperatures which would melt and destroy ordinary fibers, but in general, they have no melting point. Thus, such fibers cannot be shaped from a polymer melt as in the case of the nylons and the polyesters but rather they are shaped from polymer solutions. In general, it is more economical to wet spin or dry spin polymer solutions to produce a single large bundle of filaments than it is to spin the same number of filaments into several smaller bundles. However, a need exists for the smaller yarns.

An alternative to the spinning of smaller bundles of continuous filaments is to cut filaments of a heavy denier tow into staple fibers and process the staple fibers into spun yarns of the desired fineness. A sacrifice in yarn strength is an expected drawback in this alternative, which becomes more important as the size of the staple yarn decreases. As a general rule of thumb, an average of at least 60 synthetic or 80 cotton fibers per yarn cross section is needed for yarns of minimum acceptable strength at reasonable levels of twist. Lower than this number of fibers per cross section provides less than the minimum amount of fiber-to-fiber interaction required for good yarn strength. It is well known that synthetic filaments can be cut or stretch-broken to produce staple or sliver, respectively, and that either can be converted to useful staple-spun yarns [via e.g., the cotton or worsted systems].

It has now been found that p-aramid continuous-filament yarn or tow stretch broken on a Turbo Stapler or equivalent yields unexpectedly strong spun yarns when processed to spun yarns in a conventional manner.

BRIEF DESCRIPTION OF THE INVENTION

This invention provides a sliver of stretch broken, high strength, high modulus p-aramid fibers of which at least 50% of the fiber ends are fibrillated into at least 5 fibrils along a terminal length which is at least 50 times as long as the diameter of the unfibrillated portion of the fiber, preferably at least 100 times the diameter of the unfibrillated portion of the fiber. This sliver can be processed to a high strength spun yarn by conventional textile processing. Preferably 70-80% of the fibers in the sliver have fibrillated ends. Preferably, at least 50% of the fibrillated stretch broken fibers have 5-20 fibrils per end. Most preferably the fibrillated terminal lengths are 100 to 350 times the fiber diameter.

This invention also provides a process for preparing the sliver of stretch broken, high strength, high modulus p-aramid fibers by feeding a yarn or tow of continuous p-aramid filaments having a yarn tenacity of at least 18 gpd and a yarn modulus of at least 400 gpd under low tension into a tensioning zone, tensioning the filaments almost to their breaking tension, randomly breaking the tensioned filaments by sharply deflecting them laterally with interdigitating deflectors, removing the resulting sliver from the tensioning zone and optionally crimping the filaments. Preferably the high tension in the stretching zone is provided between two sets of restraining rolls wherein the second set of restraining rolls is operated at a speed of 2.8 to 4.0 times faster than the speed of the first set of restraining rolls. Preferably the filaments are deflected sharply in a lateral direction by two rotating, interdigitating, convoluted bars rotating at a surface speed intermediate between the speeds of the first and second sets of restraining rolls. The resulting slivers are preferably processed to spun yarns on the worsted system. Cotton system processing is possible if the length of the broken fibers is sufficiently short.

DETAILED DESCRIPTION OF THE INVENTION

Figure 1:
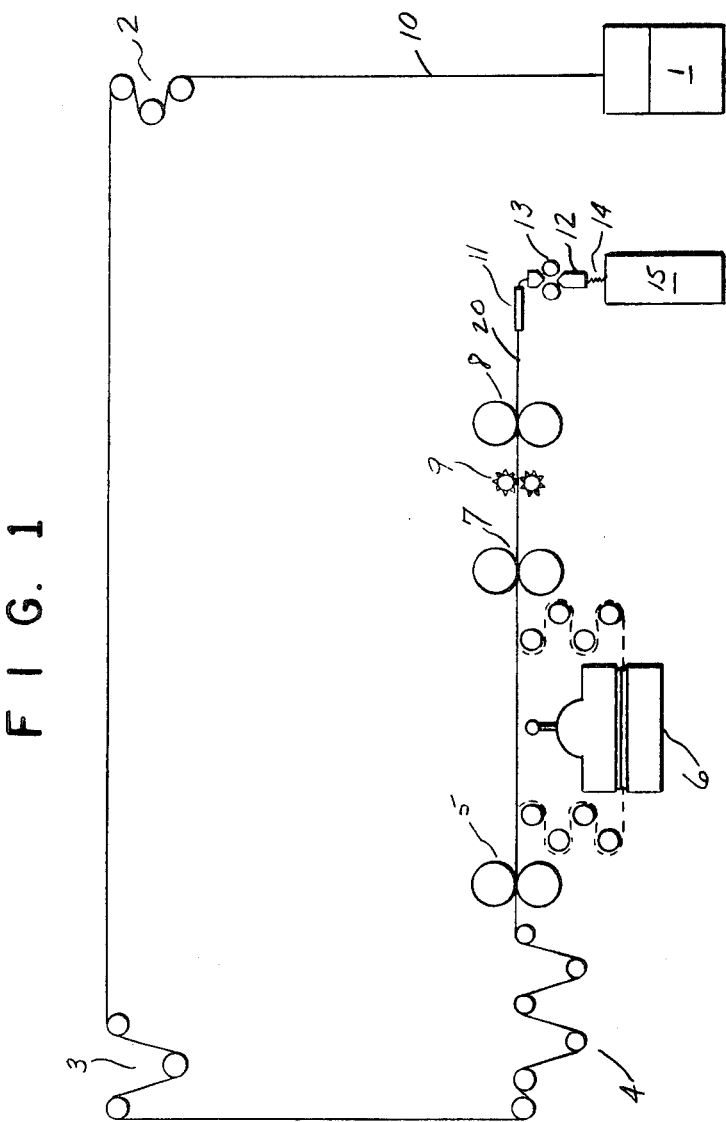
FIG. 1 is a schematic representation of apparatus suitable for use in the present invention.

The Turbo Stapler, manufactured by the Turbo Machine Co., Lansdale, PA, was originally developed as a route to high-bulk yarns from acrylic tow. It is equipped with a stretch section which serves to stretch-orient the tow by heating and drawing between feed and draw rolls, thereby developing high shrinkability. In its original utility, the stretched tow is then cooled and passed through a stretch-break zone in which it is broken randomly as a result of extension beyond its break elongation. "Breaker bars", radially mounted on rotating shafts oriented to each side of the tow path, interdigitate, creating devious paths for the tow in rapid sequence as it passes between them. Thus, in an operation suitably adjusted to the product being processed, the breaker bars impose the final increment of breaking elongation, causing random breaks among the filaments in the tow to concentrate at this location. A sliver results because of this random breaking of the filaments. The longest fibers in the resulting sliver are near the length of the "ratch" (the distance between breaker bars and front rolls). In this original use, the sliver with high shrinkability is, in part, treated in alternating atmospheres of steam and vacuum until it has essentially zero residual shrinkage. When this "fiberset" sliver is blended with other, high-shrinkability fiber, which has not been fiberset, in the worsted processing system, a yarn is produced which develops high bulkiness during dyeing or other high-temperature, wet treatment.

In the present use of a Turbo Stapler or equivalent, neither high fiber shrinkability nor high yarn (or fabric)

bulk is an objective; therefore, the stretch-orientation feature of a Turbo Stapler is not required. In fact, it cannot be used in processing p-aramid yarns and tows because they are essentially unstretchable. This section of the machine, accordingly, is bypassed, the filaments being fed directly to the stretch-break zone for applying high tension to the yarn or tow. At least some crimping of the filaments is desirable to facilitate subsequent handling.

P-aramid filaments broken according to the present invention provide a sliver of staple fibers having a unique morphology. Over most of the typical fiber's length, it is apparently unchanged from the original filament. At the ends, however, it is extensively fibrillated to provide a brush-like appearance. The fibrillated terminal lengths of the fibers are quite long with respect to fiber diameter, generally being at least 50, and preferably at least 100, times the fiber diameter. By terminal length is meant the distance at the end of each fiber along which fibrillation into at least 5 fibrils is continuous from a point of initiation to the tip of the longest fibril. The fibrils often join and separate from other fibrils along their length. Because of this, an exact count of the number of fibrils emanating from a given fiber is not possible. Some sporadic discontinuous fibrillation may occur farther away from the tip.

It is probable, although not yet established, that the long fibrillated ends of the fibers are responsible for more intense fiber-to-fiber interactions and a higher yarn strength. Spun p-aramid yarns made from sliver prepared according to the present invention have up to twice the strength of p-aramid yarns made from yarns or tow cut or broken by other means which provide little or no fibrillation of the fiber ends.

Unexpectedly, p-aramid sliver prepared by breaking p-aramid filaments on a Turbo Stapler can be spun in the worsted system to provide yarns having up to 70% of the tenacity of a continuous filament yarn of the same denier and in which the number of fibers in the average yarn cross section is as low as 30–50.

FIG. 1 schematically represents apparatus of the type useful in carrying out the process of the present invention, e.g., a Turbo Stapler such as manufactured by the Turbo Machine Co., Lansdale, PA. In the figure, 1 is a carton of continuous-filament tow; 2, 3, and 4 comprise a system of guides for tow 10 which serves to adjust the tow width and the uniformity of its thickness; 5 are infeed rolls, 6 denotes the feed rolls, heater, and draw rolls which stretch-orient the filaments in normal use but are bypassed in the practice of the present invention. Intermediate rolls 7 firmly grip the tow and feed it at a constant rate to front roll 8 which also firmly grips the tow and withdraws it at a somewhat higher speed from the breaker bars 9. Broken tow 20 is condensed laterally by guide tray 11 and fed into crimper box 12 by crimper stuffing rolls 13. Crimped sliver 14 is piddled into box 15, where it accumulates for transfer to and use in subsequent processing steps.

Figure 2:
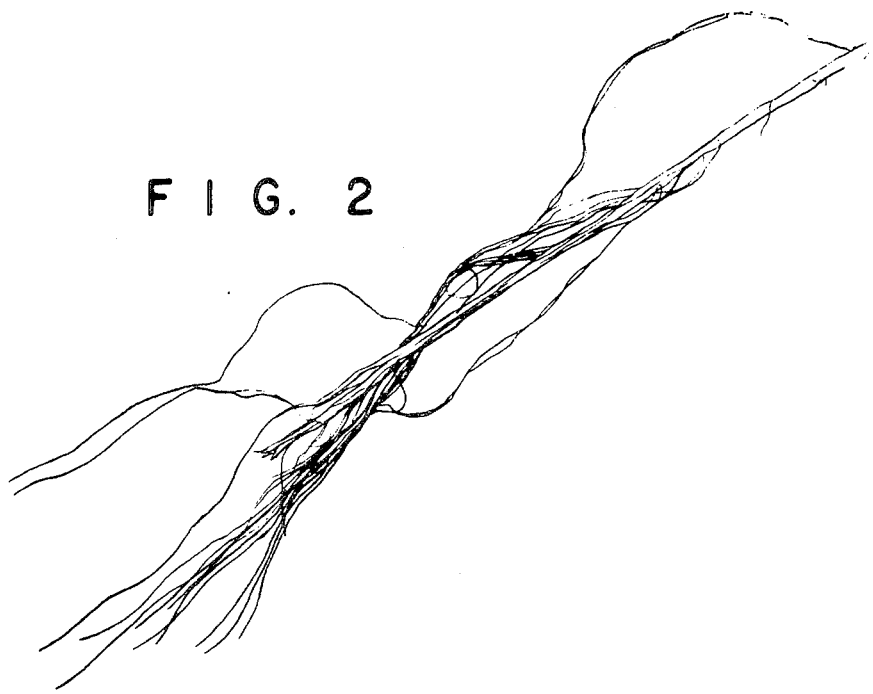
FIGS. 2 and 3 are planar views of the ends of fibers stretch broken according to the present invention.
Figure 3:
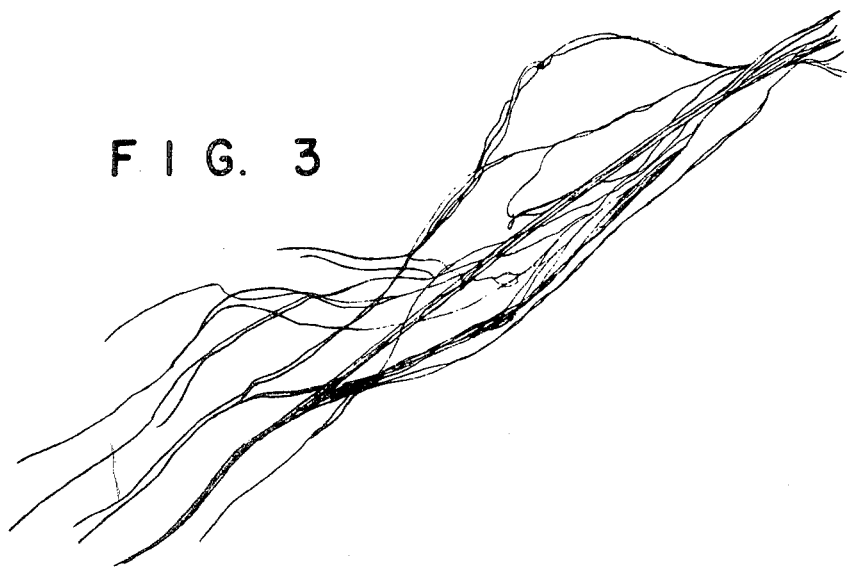

FIGS. 2 and 3 depict planar views of the ends of typical fibers provided by the present invention.

Figure 4:
FIGS. 4 and 5 are planar views of the ends of fibers processed in a Pacific Converter.
Figure 5:
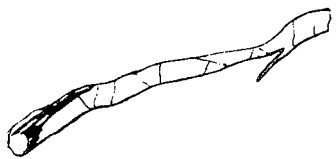

FIGS. 4 and 5 depict planar views of typical fibers produced using a Pacific Converter.

Figure 6:
FIGS. 6 and 7 are planar views of the ends of fibers processed on a Seydel machine.
Figure 7:

FIGS. 6 and 7 depict planar view of fibers taken from a commercial p-aramid spun yarn reputedly prepared by stretch breaking on a Seydel machine.

All of FIGS. 2–7 were drawn from photographs so as to provide equal magnification for all fibers.

Tensile Tests

Filament Yarns

Before tensile testing, filament yarns are twisted to a twist multiplier (TM) of 1.1 where $$TM = \frac{tpi}{\sqrt{cc}} = \frac{\sqrt{D}}{73} (tpi)$$

wherein
cc is cotton count
D is denier
tpi is turns per inch

The twisted yarns are preconditioned at 50° C. for 3 hours and then conditioned at 24° C. and 55% relative humidity for 24 hours before testing. The tensile properties are determined on a laboratory tensile tester with suitable clamps for yarn using a gauge length of 25.4 cm and a rate of elongation of 12.7 cm/min (50%/min).

Spun Yarns

Spun yarns are conditioned at 21° C. and 65% relative humidity for 16 hours before testing. The tensile properties are determined on a laboratory tensile tester using a gauge length of 25.4 cm and a rate of elongation of 2.54 cm/min (10%/min).

The starting fibers used in the following examples are poly(p-phenylene terephthalamide) yarns having a filament-yarn tenacity of about 18.7 gpd, 3% elongation at break, and a filament-yarn modulus of about 618 gpd. Other high tenacity, high modulus p-aramid yarns, e.g., those having a tenacity of up to 30 gpd and an initial modulus of 1000 gpd or more are also suitable for use in the invention.

EXAMPLE 1

Three ends of yarn of 1500 denier/1000 filament Kevlar® aramid yarn were combined into a thin uniform ribbon and fed to the infeed rolls of a Turbo Stapler as described above. The feed rolls/heater/draw rolls section was bypassed, the ribbon of yarns passing directly to the intermediate rolls which were adjusted in pressure to prevent slippage and rotated at a surface speed 107% faster than that of the infeed rolls. This indicated stretch served only to exert tension on the filaments in this span. The ribbon of filaments was then led between the breaker bars rotating at a surface speed 200% faster than that of the intermediate rolls and into the nip of the front rolls which rotated at a surface speed 3.11 times faster than that of the intermediate rolls while being firmly gripped in the nip to avoid slippage. The breaker bars were operated on a No. 3 setting, which results in about a ¼" (0.64 mm) overlap of the developed cylinders of rotation. The ratch (the distance between the centerlines of the breaker bars and the front rolls) was set to 6" (about 15 cm.). The sliver was produced at an output rate of 110 ypm. (101 m/min), passed through the crimper and piddled into a can. Fiber length in the sliver ranged from about 4" (10.2 cm.) to 6" (15.2 cm.).

The sliver was directly fed to a Roberts worsted spinning frame set for approximately 16.8× draft. The product was a 62.5 cotton count (cc) singles yarn (85 denier) having 12 tpi (twists per inch) (4.7 tpcm) and a Lea Product of 11,780. Tenacity was 12.2 gpd., elongation at break 2.8% and modulus 380 gpd. This yarn had an average of 57 filaments in the cross section.

EXAMPLE 2

The process of Example 1 was repeated on a larger scale at an output speed of 55 ypm. (50 m/min) to produce a sliver having an average fiber length of 6.4" (16.3 cm.) the longest fiber being 8.1" (20.5 cm.) and the shortest 3.2" (8 cm.).

Two ends of the resulting sliver were pin drafted with 4× draft to yield a 3-grain sliver (1915 denier), then processed on a worsted spinning frame as in Example 1 to yield a 70 cc. yarn (76 denier) having tenacity/elongation/modulus of 9.7 gpd./2.5%/299 gpd. The average number of filaments per cross section is 51. The pin drafting provided a more uniform yarn. There were fewer process breaks, leading to improved process continuity.

EXAMPLE 3

20 Ends of 1500 denier yarn were processed into sliver following the procedure of Example 1 except that sliver was produced at 102 ypm. (93 m/min.) and maximum overlap of the breaker bars in the yarn/sliver path was reduced to ⅛" (0.32 cm.). The yarn had tenacity/elongation/modulus of 12.4 gpd/2.2%/437 gpd. The yarn had an average of 35 fibers per cross section. The yarn had a cotton count of 102 (52 denier).

Twelve fibers were extracted from a sliver prepared in the same manner as above and examined microscopically. The results are summarized in the following table.

| Fiber | Terminal Length (mm) | Terminal Length in Fiber Diameters | No. of Fibers |
|---|---|---|---|
| 1 | 4.0 | 328 | 15–20 |
| 2 | 1.1 | 90 | 5–10 |
| 3 | 4.0 | 328 | 10–15 |
| 4 | 4.0 | 328 | 10–15 |
| 5 | negligible | 0 | — |
| 6 | negligible | 0 | — |
| 7 | 0.25 | 20 | 5 |
| 8 | 0.7 | 57 | 10 |
| 9 | 2.2 | 180 | 15–20 |
| 10 | 4.0 | 328 | 10–15 |
| 11 | 0 | 0 | — |
| 12 | 0 | 0 | — |

Average all fibers = 138
Average fibrillated fibers = 207

Further processing tended to increase the percentage of fiber ends which were fibrillated.

EXAMPLE 4

(Comparative)

This example demonstrates an alternative stretch-breaking starting with the same p-aramid continuous-filament yarns which does not provide the sliver of the present invention.

Two lots of tow having a denier of 110,000 comprising 1.5-denier filaments were processed on a Pacific Converter, Lot A with a 6" (15.2 cm) square-cut blade and Lot B with a 4½" (11.4 cm) square-cut blade. Photomicrographs of the ends of fibers appear substantially as illustrated in FIGS. 4 and 5.

The slivers were processed in the worsted system through pin drafting, roving, and spinning to yield yarns having properties as described in the following table.

| | Avg. Fiber Length | Cotton Count | Denier | Modulus gpd. | % E | Tenacity gpd. |
|---|---|---|---|---|---|---|
| Lot A | 5.5 | 74 | 72 | 239 | 2.1 | 6.0 |
| Lot B | 4.5 | 73 | 73 | 177 | 2.7 | 7.2 |

It is readily seen from these data that yarns produced from Pacific Converter sliver are not the equivalent to those made according to the present invention.

EXAMPLE 5

(Comparative)

This example demonstrates that commercial spun yarns made from equivalent p-aramid continuous-filament yarns via sliver obtained using a modified Seydel stretch breaker does not provide spun yarn having properties equivalent to those provided by the present invention.

| | Sample 1 | Sample 2 |
|---|---|---|
| Cotton count | 83 (64 denier) | 74 (71 denier) |
| Tenacity (gpd.) | 6.1 | 5.4 |
| Elongation (%) | 2.5 | 2.4 |
| Modulus (gpd.) | 176 | 178 |
| Fiber length, avg. | 3.5 | 3.5 |
| low | 2.2 | 1.2 |
| high | 4.7 | 5.3 |
| Fibers/cross section | 43 | 48 |

The reasons for higher strength in yarns produced in the process of this invention are believed to be due to the highly fibrillated fiber ends. Differences in average fiber length also probably contribute. Such differences could not be avoided because (1) the Turbo Stapler ordinarily provides at least 6 in (15 cm) staple lengths, (2) the Pacific Converter provides lengths of at most 6 in (15 cm), (3) the staple lengths of comparative Example 5 were not under applicant's control. The contribution of different staple lengths to the different tenacities achieved may be estimated from known relationships shown in the published literature.

SAWTRI (South African Wool & Technical Research Institute of the CSIR) Technical Report. No. 223 by L. Hunter, June 1974, investigated the relationships between yarn and fiber properties for 306 singles wool worsted yarns. On page 40 the author's findings are summarized by the following mathematical expression $$BS \propto \frac{(\text{tex})^{1.3} (BT)^{1.1} (L)^{0.2} (\text{twist})^{0.2}}{\text{fiber diameter}}$$

where
BS is breaking strength (not normalized)
BT denotes "bundle tenacity" (strength measured using a very short gage length)
L is average fiber length While only wool fibers were involved in the study, it is expected that this relationship should be applicable to other fibers.

In the examples of this specification, fiber diameter and bundle tenacity, as defined, were constant throughout. Twist was not available in all tests. Twist levels employed were, however, quite comparable. Because the above mentioned publication indicates that large changes in twist are required to significantly affect BS, twist was ignored in the subsequent comparisons. Also, denier (D) rather than tex was employed since the two are directly proportional and tenacity (T) was utilized rather than BS [i.e., T=BS/(tex)].

Taking the above into consideration, the above equation can be rewritten as follows:

$$\frac{T_2}{T_1} = \left(\frac{D_2}{D_1}\right)^{0.3} \left(\frac{L_2}{L_1}\right)^{0.2}$$

If $T_1$, $L_1$, and $D_1$ are as measured for a comparison yarn (Examples 4 and 5) this equation can be used to compute what its tenacity ($T_2$) should have been if it had had the denier ($D_2$) and average fiber length ($L_2$) of a given yarn of the invention (Examples 1 through 3). Comparison of these computed tenacities ($T_2$) with tenacities ($T_m$) measured for examples of the invention should be a good indicator of any unexplained improvement. Comparisons for Examples 1 through 3 are shown in the following Table where 4a and 4b, and 5a and 5b refer to the two sets of data in each comparison Example.

| Comparison Examples | $D_2$ | $D_1$ | $L_2$ | $L_1$ | $T_1$ | $T_2$ | $T_m$ |
|---|---|---|---|---|---|---|---|
| 4a to 1 | 85 | 72 | 5.0 | 5.5 | 6.0 | 6.2 | 12.2 |
| 4b to 1 | ↓ | 73 | ↓ | 4.5 | 7.2 | 7.7 | ↓ |
| 5a to 1 | ↓ | 64 | ↓ | 3.5 | 6.1 | 7.1 | ↓ |
| 5b to 1 | ↓ | 71 | ↓ | 3.5 | 5.4 | 6.1 | ↓ |
| 4a to 2 | 76 | 72 | 6.4 | 5.5 | 6.0 | 6.3 | 9.7 |
| 4b to 2 | ↓ | 73 | ↓ | 4.5 | 7.2 | 7.8 | ↓ |
| 5a to 2 | ↓ | 64 | ↓ | 3.5 | 6.1 | 7.2 | ↓ |
| 5b to 2 | ↓ | 71 | ↓ | 3.5 | 5.4 | 6.2 | ↓ |
| 4a to 3 | 52.1 | 72 | 6.4 | 5.5 | 6.0 | 5.6 | 12.4 |
| 4b to 3 | ↓ | 73 | ↓ | 4.5 | 7.2 | 7.0 | ↓ |
| 5a to 3 | ↓ | 64 | ↓ | 3.5 | 6.1 | 6.5 | ↓ |
| 5b to 3 | ↓ | 71 | ↓ | 3.5 | 5.4 | 5.6 | ↓ |

It is clear from examination of the last two columns of the table that, even when tenacity ($T_1$) of each comparison example is normalized to the same denier and fiber length as in a yarn according to the invention, the normalized tenacity ($T_2$) is still significantly below the measured tenacity ($T_m$) of the yarn according to the invention. Although it is not completely understood why yarns obtained using the Turbo Stapler should be unexpectedly stronger, applicant believes that the long subdenier fibrils on each end of fiber stretch broken on the Turbo Stapler account for the improvement.

FIGS. 2 and 3 are planar views of fiber ends typical of those seen in the slivers produced on the Turbo Stapler. Those produced on the Pacific Converter and Seydel from fibers of the same composition are portrayed in FIGS. 4 and 5 and in FIGS. 6 and 7, respectively. The striking differences in morphology are both readily apparent. It is believed that the highly fibrillated ends of fibers from Turbo Stapler sliver lead to better fiber cohesion. It is clear that high-tenacity, high-modulus p-aramid filaments processed according to the present invention are convertible to spun yarns which retain a substantially higher proportion of their filament tensile properties than when processed by other available means.

It will be apparent to one skilled in the textile-processing arts that the Turbo Stapler, per se, is not essential to the practice of this invention. A simpler machine will suffice if it provides the controlled-speed input means, means for sharp deflection of the filaments in a lateral direction while under high tension means for providing high tension in a stretching zone and optionally a crimper to superficially consolidate the product sliver.

While in its simplest form this process does not require each element of worsted-system processing, it may be found desirable to use other elements than those used in experiments described in the examples. The fiber setter, normally associated with the Turbo Stapler, hasn't been required, since no draw-orientation was employed; and bulkiness through differential shrinkage of fibers in a sliver was not an objective. Not unexpectedly, use of pin drafting and roving operations produced an improvement in spun yarn uniformity. It is expected that still further improvement in uniformity may be realized with more thorough drafting, and thereby blending, of input slivers. There is a probability that double breaking will also produce an improvement in yarn uniformity by elimination of the occasional long fiber. This should permit closer setting of subsequent drafting elements and, as a result, better control of fibers in these operations.

The use of a suitable textile finish is an essential element in optimum textile processing of any fiber. Sliver crimp is also beneficial in subsequent processing, and the amount of crimp is a quality-controlling as well as a processibility variable. Those skilled in textile processing arts will recognize the need for good control of crimper variables and the desirability of optimizing the type and amount of textile finish in this and other processing steps. Supplemental finish may be applied by spray (for example) before or after the crimper.

What is claimed is:

1. A sliver of stretch broken, high strength, high modulus p-aramid fibers of which at least 50% of the fiber ends are fibrillated into at least 5 fibrils along a terminal length which is at least 50 times as long as the diameter of the unfibrillated portion of each fiber.

2. The sliver of claim 1 wherein at least 70% of the fiber ends are fibrillated.

3. The sliver of claim 1 wherein at least 80% of the fiber ends are fibrillated.

4. The sliver of claim 1 wherein the terminal length of the fibrils is at least 100 times the fiber diameter.

* * * * *